(12) United States Patent
Morris (10) Patent No.: US 12,525,080 B2
(45) Date of Patent: Jan. 13, 2026

(54) NETWORK-BASED CONTROL OF MOVABLE BARRIER OPERATIONS FOR AUTONOMOUS VEHICLES

(71) Applicant: THE CHAMBERLAIN GROUP LLC, Oak Brook, IL (US)

(72) Inventor: David R. Morris, Glenview, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 12 days.

(21) Appl. No.: 18/763,305

(22) Filed: Jul. 3, 2024

(65) Prior Publication Data

US 2024/0355162 A1    Oct. 24, 2024

Related U.S. Application Data

(63) Continuation of application No. 18/242,501, filed on Sep. 5, 2023, now Pat. No. 12,056,971, which is a continuation of application No. 17/384,149, filed on Jul. 23, 2021, now Pat. No. 11,763,616, which is a continuation of application No. 16/454,978, filed on Jun. 27, 2019, now Pat. No. 11,074,773.

(60) Provisional application No. 62/690,624, filed on Jun. 27, 2018.

(51) Int. Cl.
*G07C 9/00*    (2020.01)
*B60W 50/00*   (2006.01)
*G05D 1/00*    (2006.01)
*B60L 53/30*   (2019.01)

(52) U.S. Cl.
CPC ......... *G07C 9/00896* (2013.01); *B60W 50/00* (2013.01); *G05D 1/0276* (2013.01); *B60L 53/30* (2019.02); *B60W 2050/0083* (2013.01); *G07C 2009/00928* (2013.01)

(58) Field of Classification Search
None
See application file for complete search history.

(56) References Cited

U.S. PATENT DOCUMENTS 11,074,773 B1 *   7/2021   Morris ................... B60L 53/68

* cited by examiner

*Primary Examiner* — K. Wong
(74) *Attorney, Agent, or Firm* — Dority & Manning, P.A.

(57) ABSTRACT

The present disclosure generally relates to a system and method for enabling on-demand, temporary storage of an autonomous vehicle in vehicle storage areas of existing infrastructures. The vehicle storage areas include one or more movable barrier operators configured to control access to the vehicle storage areas via movable barriers. An autonomous vehicle access control platform is configured to enable access to individual ones of the vehicle storage areas by a single-use access credential sent to at least one of the autonomous vehicle and one of the movable barrier operators. The autonomous vehicle access control platform communicates with a transportation-as-a-service (TaaS) platform that pairs an autonomous vehicle with a vehicle storage area for storage based at least on a factor or parameter including the location of the vehicle storage area relative to the autonomous vehicle.

20 Claims, 11 Drawing Sheets

NETWORK-BASED CONTROL OF MOVABLE BARRIER OPERATIONS FOR AUTONOMOUS VEHICLES

CROSS-REFERENCE TO RELATED APPLICATIONS

This is a continuation of U.S. patent application Ser. No. 18/242,501, filed Sep. 5, 2023, entitled NETWORK-BASED CONTROL OF MOVABLE BARRIER OPERATORS FOR AUTONOMOUS VEHICLES, which is a continuation of U.S. patent application Ser. No. 17/384,149, filed Jul. 23, 2021, entitled NETWORK-BASED CONTROL OF MOVABLE BARRIER OPERATORS FOR AUTONOMOUS VEHICLES, which is a continuation of U.S. patent application Ser. No. 16/454,978, filed Jun. 27, 2019, entitled NETWORK-BASED CONTROL OF MOVABLE BARRIER OPERATORS FOR AUTONOMOUS VEHICLES, which issued as U.S. Pat. No. 11,074,773 on Jul. 27, 2021, which claims the benefit of U.S. Provisional application No. 62/690,624, filed Jun. 27, 2018, entitled NETWORK-BASED CONTROL OF MOVABLE BARRIER OPERATORS FOR AUTONOMOUS VEHICLES, which are all hereby incorporated by reference in their entireties herein.

FIELD

This disclosure relates to control systems for directing autonomous vehicles, and more specifically, to control systems for directing autonomous vehicles to vehicle storage areas.

BACKGROUND

Many people own or lease vehicles and store such vehicles in either a personal garage or a portion of a shared/communal resource such as a parking lot or garage. As the percentage of autonomous vehicles on roadways increases, the number of personally-owned vehicles may decrease and, as such, people will be less likely to have a vehicle parked in their garage or parking spot.

Many transportation as a service ("TaaS") companies, such as Lyft® and Uber®, exist today and are changing the automotive industry from one where individual consumers own vehicles to one where vehicles are provided as a service. Consumers now expect to have on-demand transportation with no more than a click of a button.

TaaS companies are currently developing autonomous vehicle fleets. Autonomous vehicles promise to reduce crashes, save lives, prevent traffic congestion, reduce fuel consumption, and improve land use. However, since these autonomous vehicles will be owned by service providers such vehicles will not have access to the infrastructures used to store personally-owned vehicles, and logistical problems of service and storage will arise when trying to meet consumers' expectation of on-demand transportation. For example, if storage of autonomous vehicles is centralized, wait times will increase and routing logistics become more complicated especially in times of high demand such as the morning commute.

DETAILED DESCRIPTION

In one aspect of the present disclosure, an autonomous vehicle control system is provided that balances a consumer's expectation of having rapid on-demand transportation with the realities of implementing autonomous vehicles. The autonomous vehicle control system facilitates autonomous vehicles to be effectively and efficiently stored using existing infrastructures, like personal garages and parking spots. The autonomous vehicle control system allows a fleet of TaaS vehicles to be stored in existing infrastructures and to be efficiently dispersed in the existing infrastructures in order to meet consumer demand.

In accordance with another aspect of the present disclosure, an autonomous vehicle control system is provided that enables on-demand, temporary storage of autonomous vehicles in vehicle storage areas of existing infrastructures. The vehicle storage areas are each associated with one or more movable barrier operators configured to control access to the vehicle storage areas via one or more movable barriers. The autonomous vehicle control system includes an autonomous vehicle access control platform that is configured to enable access to the vehicle storage area such as by sending a single-use access credential to at least one of an autonomous vehicle and a movable barrier operator associated with the vehicle storage area. The single-use access credential may be generated by, for example, a single-use credential generator of an autonomous vehicle access control platform. The single-use credential generator may generate a single-use access control credential that is only valid to be used for a fixed period of time or, for example, only valid to be used in a window of time surrounding an estimated arrival time of the vehicle at a vehicle storage area.

The autonomous vehicle control system may pair an autonomous vehicle with a vehicle storage area for storage based at least in part on the location of the vehicle storage area relative to the autonomous vehicle. The autonomous vehicle control system may consider a number of other data when pairing an autonomous vehicle with a vehicle storage area. For example, the autonomous vehicle control system may consider the ability of an autonomous vehicle to make use of a charger in the vehicle storage area, the ability of an autonomous vehicle to access a wireless network of the vehicle storage area, the size of the vehicle storage area relative to the size of the vehicle, as well as the storage history of other vehicles that have used a particular vehicle storage area.

The autonomous vehicle control system improves the operation of autonomous vehicles by addressing resource expenditure (e.g., fuel as well as wear and tear on the vehicles) and time delay issues inherent in centralized storage solutions for autonomous vehicles.

Moreover, the autonomous vehicle control system provides benefits to consumers that have unused vehicle storage areas as a result of their reliance on TaaS companies to meet those consumers' transportation needs. Specifically, users that have unused vehicle storage areas are able to monetize that vehicle storage area by allowing the autonomous vehicles to park in the vehicle storage area for the purposes of storage and service. When an autonomous vehicle uses a vehicle storage area provided by a user, the user is remunerated by the TaaS company who owns or is otherwise responsible for operating the autonomous vehicle.

The autonomous vehicle control system may include or access one or more data structures such as databases to store information related to vehicle storage areas. For example before an autonomous vehicle parks itself (or is otherwise parked) in a space of a vehicle storage area, the autonomous vehicle may collect data regarding the vehicle storage area and provide the collected data to the one or more databases. The collected data will be used by the autonomous vehicle control system to determine the suitability of the space for autonomous vehicle storage and service.

The autonomous vehicle control system may further use: data stored in the one or more databases by the user of the vehicle storage area; or data stored in the database by one or more electronic devices associated with the vehicle storage area, for example, one or more data collected by sensors such as image sensors, microphones, or hazardous gas detectors. For example, when a user creates a profile with the access control platform server that indicates the user's vehicle storage area is available for use by autonomous vehicles, the user may specify one or more pieces of information about themselves and/or the vehicle storage area. In the case of the one or more electronic devices supplying data, the data may be collected from one or more sensors or those one or more electronic devices.

The autonomous vehicle's collection of data related to a vehicle storage area may include determining whether parameters describing the physical dimensions of a particular vehicle storage area have been previously stored in a database and, if not, the autonomous vehicle may use one or more sensors (such as image-based or sound-based) to determine the physical dimensions. For example, the autonomous vehicle may determine the dimensions of the vehicle storage area and then communicate the dimensions of the vehicle storage area to the autonomous vehicle control system. The autonomous vehicle control system may then use the obtained dimensions of the vehicle storage area to pair autonomous vehicles to the vehicle storage area based on known dimensions of the autonomous vehicles and known dimensions of the vehicle storage area.

Such a determination of suitability provides a level of risk control or mitigation for TaaS companies. Because there is risk in storing an autonomous vehicle in a secured space not owned, managed or strictly under the control of the TaaS company, the TaaS company may desire an objective measure of the risk associated with storage at a particular vehicle storage area. For example, the autonomous vehicle, in addition to detecting the dimensions of the vehicle storage area, may determine the presence or absence of combustible materials, sprinkler systems, objects likely to fall on or otherwise damage the vehicle, and any other observable hazard that presents a storage risk to the autonomous vehicle. Any or all of these detected environmental conditions may be taken into consideration by the autonomous vehicle control system to determine the suitability or risk of storing an autonomous vehicle in a vehicle storage area. The autonomous vehicle control system may also use data that a user inputs into the profile associated with the vehicle storage area as well as data from the one or more electronic devices associated with the vehicle storage area to determine the suitability or risk associated with storing autonomous vehicle in a vehicle storage area.

A TaaS company may determine a risk profile, indicating a storage and service risk the TaaS company is willing to tolerate, and the autonomous vehicle control system may pair an autonomous vehicle with a vehicle storage area based on the storage risk the TaaS company is willing to tolerate. Furthermore, upon arrival at a vehicle storage area, the autonomous vehicle may perform an independent risk analysis of the vehicle storage area to determine if the storage risk has changed—that is, whether a current risk is different than the storage risk previously calculated by the autonomous vehicle control system relative to environmental observations made by other autonomous vehicles. If the risk is different, the autonomous vehicle may reject the vehicle storage area, update the autonomous vehicle control system with new risk parameters, and request that the autonomous vehicle control system find a new vehicle storage area for the autonomous vehicle.

Figure 1:
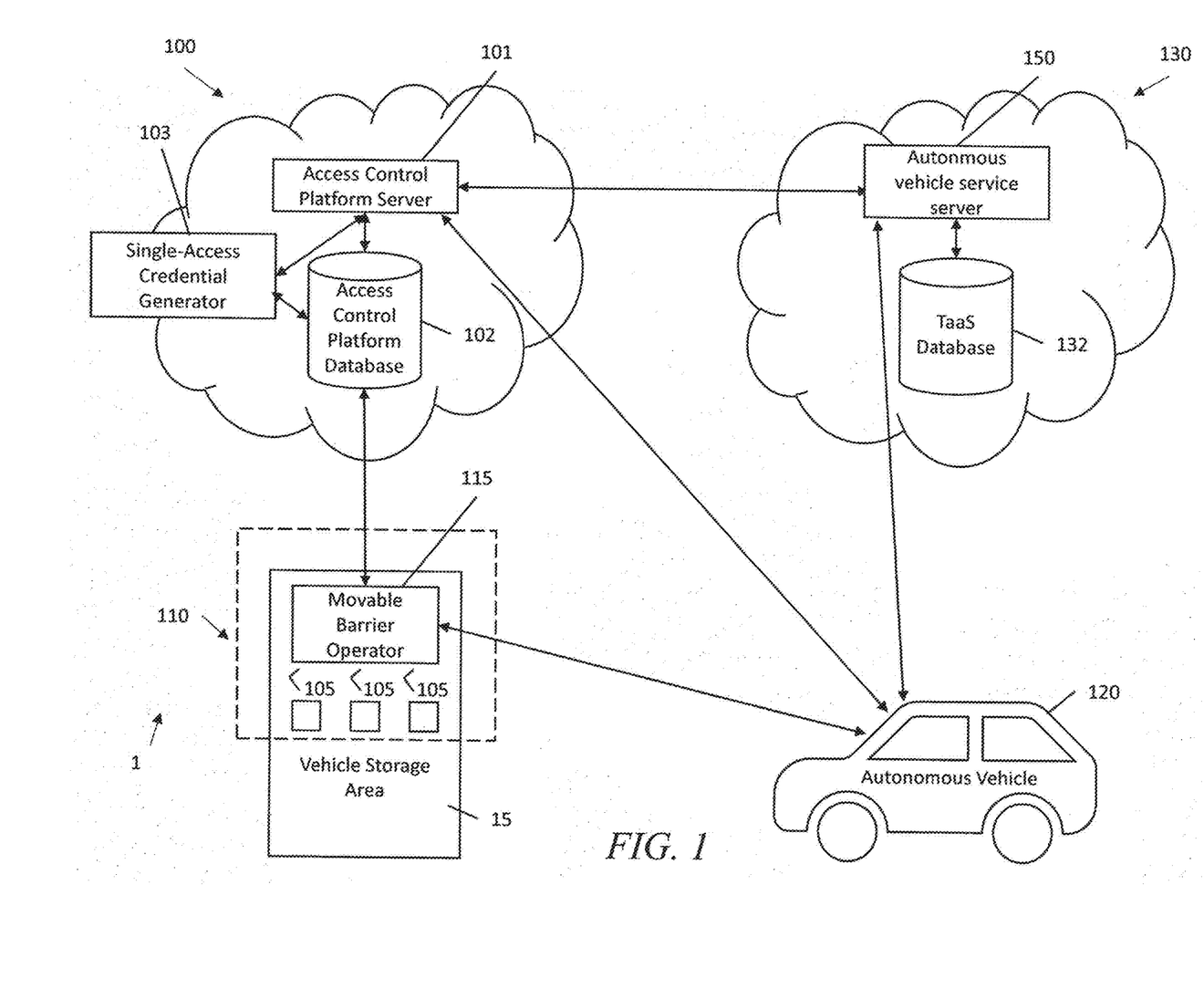
FIG. 1 is a block diagram of an example autonomous vehicle control system for enabling the temporary storage of autonomous vehicles in existing vehicle storage areas.

With reference to FIG. 1, an autonomous vehicle control system 1 is illustrated. The autonomous vehicle control system 1 includes an autonomous vehicle access control platform 100 that includes an access control platform server 101 connected to an autonomous vehicle service server 150 of a TaaS platform 130 and to a vehicle storage system 110. The access control platform server 101 may connect to the autonomous vehicle service server 150 and the vehicle storage system 110 over one or more networks such as the Internet. Optionally, the access control platform server 101 may also connect to and communicate directly with an autonomous vehicle 120, again, over one or more communications networks such as the Internet and/or wide-area (e.g., cellular phone communication) wireless systems. The access control platform server 101 may be configured to send, receive, associate, determine, and cause to be stored one or more status parameters, demographic data, access credentials, and vehicle storage system commands.

The vehicle storage system 110 may include one or more movable barrier operators 115 and one or more vehicle storage areas 15. The autonomous vehicle control system 1 is operable to direct a plurality of autonomous vehicle 120, such as dozens of hundreds of autonomous vehicles 120 in urban, suburban and rural areas, to any one of a plurality of vehicle storage areas 15, such as dozens or hundreds of home garages owned by users. The autonomous vehicle control system 1 also facilitates operation of the movable barrier operators 115 associated with the vehicle storage areas 15 once the autonomous vehicles 120 arrive at the vehicle storage areas 15.

The vehicle storage system 110 may include one or more access control devices 105. In one embodiment, the one or more access control devices 105 include a lock of a passageway door that opens to the vehicle storage area 15. In a commercial setting with multiple vehicles in a vehicle storage area, the access control devices 105 may include locks that restrict movement of vehicles in the vehicle storage area 15. The one or more access control devices 105 may be configured to communicate over a network such as the Internet. The access control devices 105 of the vehicle storage platform 110 may also be networked to each other and to the movable barrier operator 115 in a peer-to-peer ad hoc fashion using a short-range communication protocol such as, Zigbee®, Bluetooth® (or Bluetooth Low Energy (BLE)), or Near Field Communications (NFC), or Wi-Fi with at least one of the access control devices 105 of the vehicle storage platform 110 being able to access a communication network such as the Internet. The one or more access control devices 105 may also be in communication with one or more movable barrier operators 115.

Figure 2:
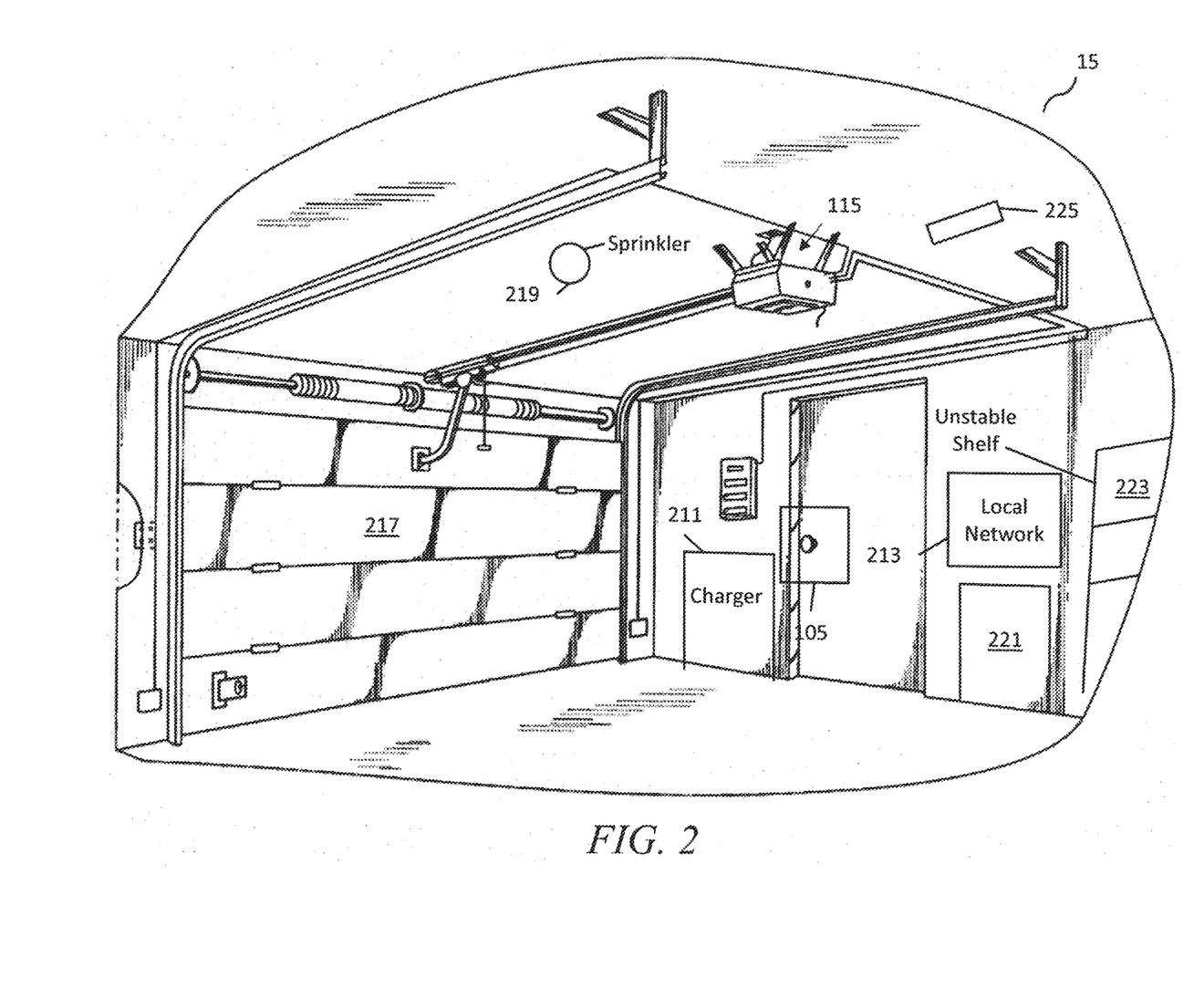
FIG. 2 is a perspective view of an example vehicle storage area having various conditions that increase or decrease the risk, or desirability, associated with parking an autonomous vehicle in the vehicle storage area.
Figure 7:
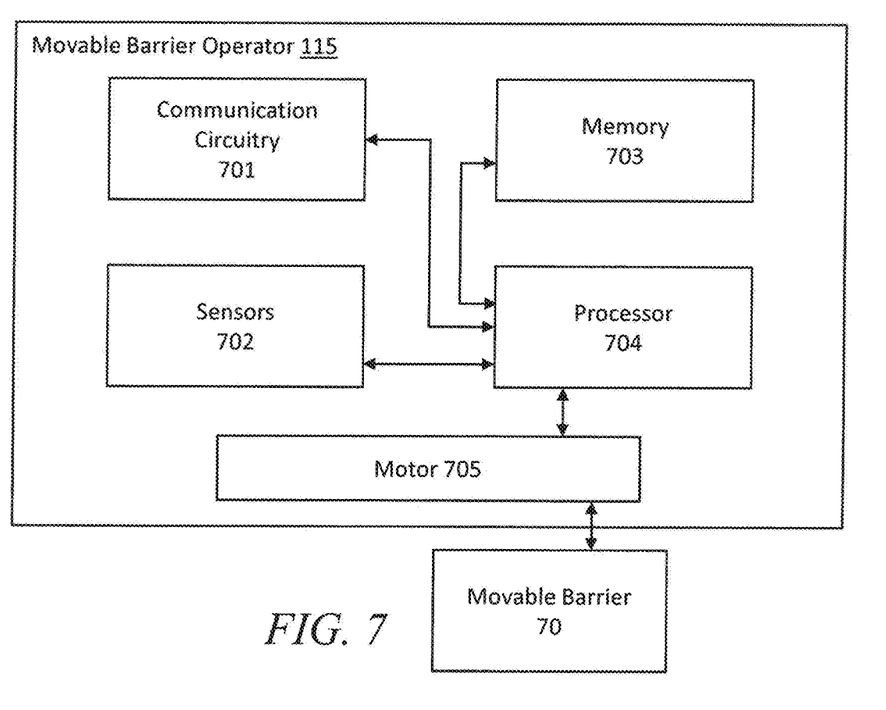
FIG. 7 is a functional-block diagram of an example movable barrier operator of the system of FIG. 1.

As shown in FIG. 2, the movable barrier operator 115 may be, for example, a garage door opener that adjusts the position of a segmented garage door 217 to control access to the vehicle storage area 15. In other embodiments, the movable barrier operator 115 may be configured to shift or swing a gate as some examples. As shown in FIG. 7, the movable barrier operator 115 may have a processor 704 operatively connected to a memory 703, communication circuitry 701, a motor 705 configured to raise and lower or otherwise move a movable barrier 70 such as a gate or a door (e.g., garage door 217), and one or more sensors 702. The one or more sensors 702 may detect one or more environmental conditions of the vehicle storage area 15. For example, the one or more sensors 702 may detect the presence of smoke, heat, flames, carbon monoxide, excess humidity, the presence of standing water, the presence of an obstacle in a space designated for an autonomous vehicle, or any other environmental factor that affects the suitability of the vehicle storage area 15 for use by the autonomous vehicle 120. The movable barrier operator 115 may transmit the environmental conditions to the autonomous vehicle access control platform 100 and/or the autonomous vehicle service server 150.

Figure 3:
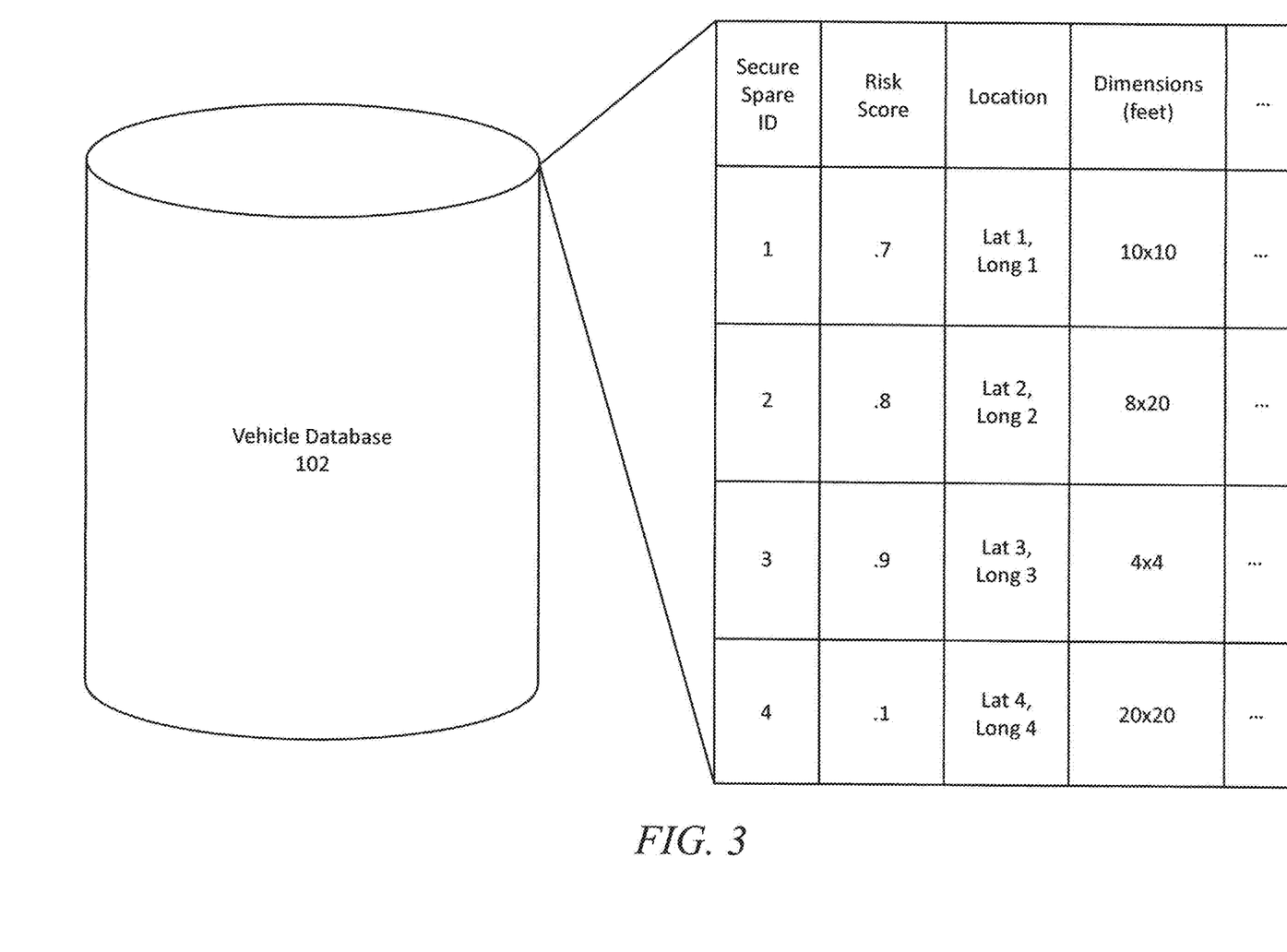
FIG. 3 is a schematic view of an example of a data structure of the autonomous vehicle control system of FIG. 1 storing various data related to a vehicle storage area.

The access control platform server 101 may be operatively connected to a memory of the access control platform 100 containing an access control platform data structure such as database 102 (FIG. 3). The database 102 stores one or more status parameters, such as environmental conditions sensed by the one or more sensors 702, risk scores, secure space IDs, physical parameters such as area or volume (e.g., length, width and height) of the vehicle storage area 15, demographic data, access credentials, or commands from the access control platform server 101. The access control platform database 102 may further store one or more user accounts associated with one or more vehicle storage platforms 110 and profiles of one or more vehicle storage areas 15 provided by one or more users. The one or more status parameters, risk scores, vehicle storage area condition parameters, vehicle storage area IDs, physical parameters of a vehicle storage area, demographic data, access credentials, and commands stored in the access control platform database 102 may be associated with one or more of the stored user accounts. Any or all of the parameters described as being stored in the access control platform database 102 may also be stored in a memory of the TaaS platform 130, such as a memory containing TaaS database 132.

The status parameters may further include parameters such as the geographical location (e.g., GPS coordinates, street address, etc.) and operating status of one or more movable barrier operators 115 associated with a user account; the presence or absence of one or more peripheral devices, such as charging devices and WiFi access points, in the one or more vehicle storage area 15 controlled by the one or more movable barrier operators 115; rates offered by one or more users for use of one or more vehicle storage areas 15; and an indication of whether or not the vehicle storage areas 15 are currently occupied.

The access control platform database 102 may further store one or more risk scores for one or more of the vehicle storage areas 15. For example, the access control platform database 102 may associate a risk score with a vehicle storage area ID. A secure space ID is an identifier that uniquely identifies a vehicle storage area 15. The risk score may be determined and output by a risk calculation process implemented on either the access control platform server 101 or the TaaS platform 130, or a combination thereof.

The risk calculation may be embodied in or otherwise performed by, for example, a single layer neural expert system, a multilayer neural expert system, or a neuro-fuzzy system having one or more processes under control. For example, the risk calculation may be implemented to control the process of determining the risk score using one or more parameters stored in at least one of the access control platform database 102 and the TaaS database 132 and/or one or more vehicle storage area condition parameters received from at least one of the movable barrier operator 115 and the autonomous vehicle 120.

With reference to FIG. 2, the vehicle storage area parameters may indicate one or more conditions present in the vehicle storage area 15. The one or more conditions identified as being present by the vehicle storage area conditions parameters may include identification of the position of one or more objects that could fall on or otherwise damage the autonomous vehicle 120 such as a loose ceiling tile 225 or a unstable shelf 223; the presence of risk mitigation devices such as sprinklers 219 or other fire extinguishers; and the presence of hazardous materials such as hazardous materials 221. The hazardous materials 221 may include, for example, flammable chemicals.

Figure 4:
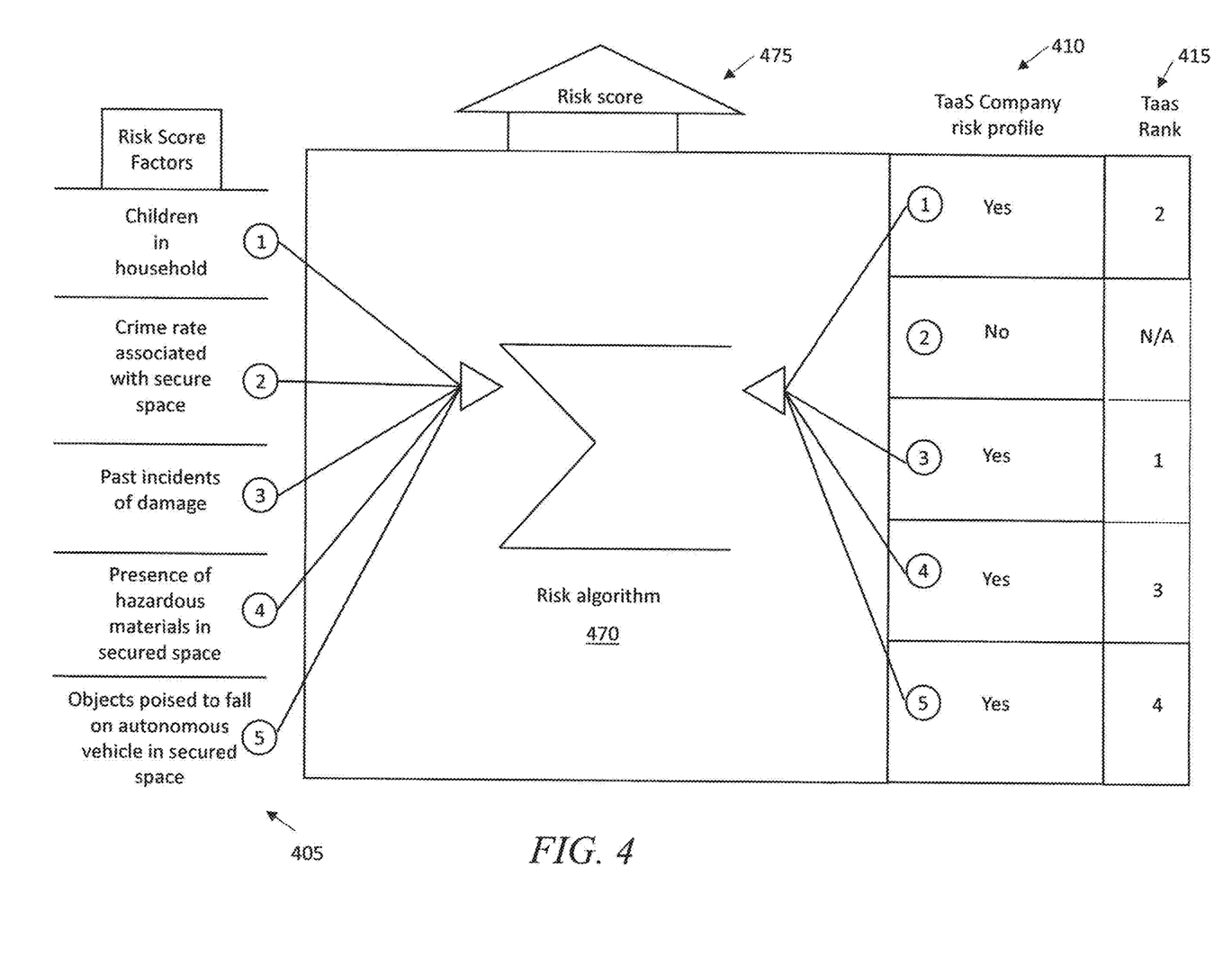
FIG. 4 illustrates an example TaaS company risk profile of a vehicle storage area created from available risk score factors.

The risk score factors that are input into the risk calculation may be customizable based on the needs or risk tolerance of a particular TaaS company. For example, FIG. 4 provides a risk algorithm 470 that allows the TaaS company to create a TaaS company risk profile 410 by selecting and/or ranking, using for example a TaaS rank 415, in importance one or more risk score factors 405 such as presence of children in a household, crime rate associated with the neighborhood in which the vehicle storage area 15 is located, past incidence of damage to autonomous vehicles 120 parked in the vehicle storage area 15, the presence of hazardous materials in the vehicle storage area 15, and the presence of objects poised to fall on the autonomous vehicle in the vehicle storage area 15. Each of the selected risk parameters and their importance may then be input into the risk algorithm to determine a risk score 475 for a vehicle storage area 15.

Figure 5:
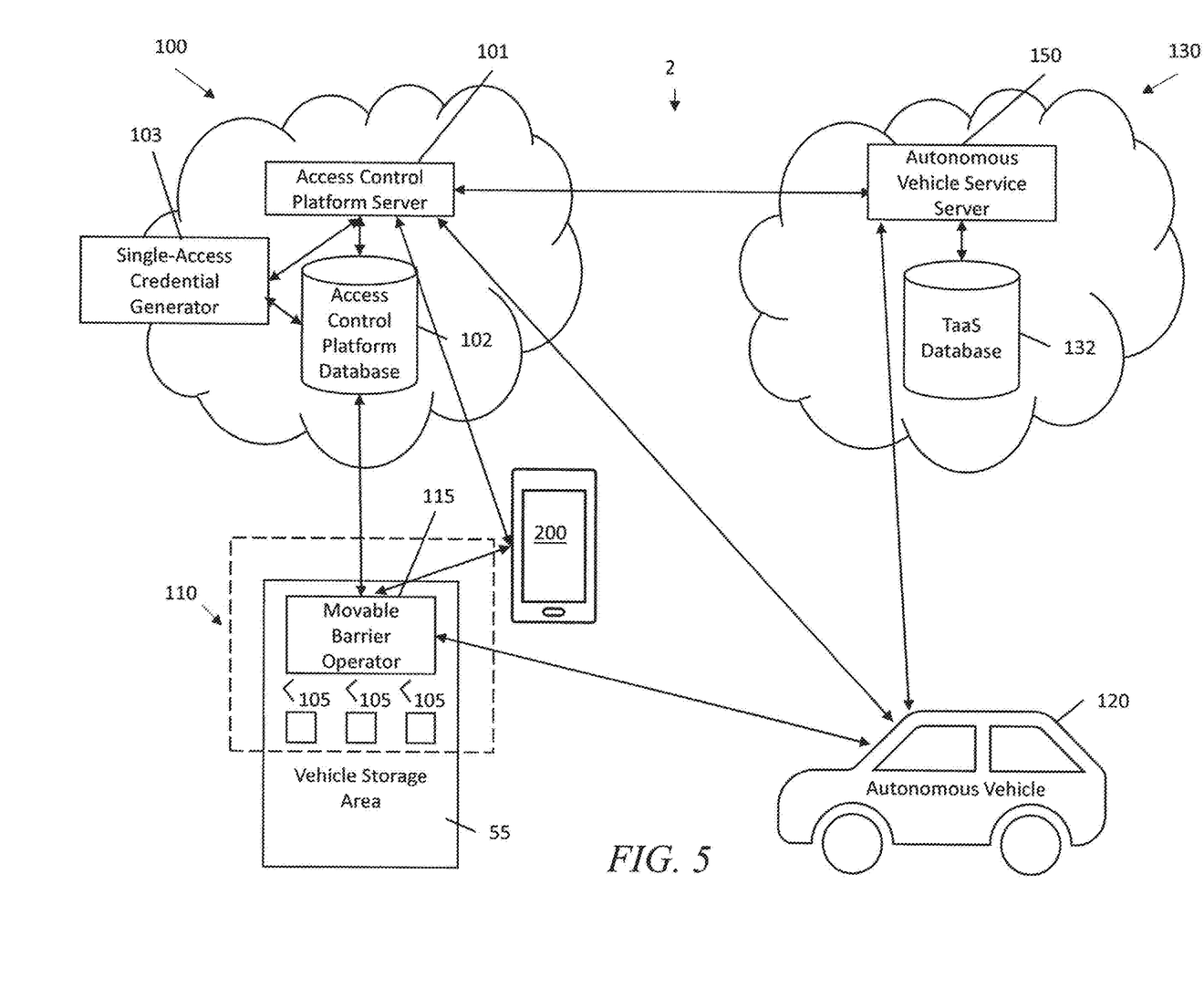
FIG. 5 is a block diagram of another example autonomous vehicle control system implemented as an authorized user-in-the-loop control system.

With reference to FIG. 5, an authorized user-in-the-loop autonomous vehicle control system 2 is provided that is similar in many respects to the autonomous vehicle control system 1 and shares many of the same components. The autonomous vehicle control system 2 includes a user device 200 connected to any or all of the access control platform server 101, the movable barrier operator 115, the autonomous vehicle 120, and the TaaS platform 130. The user device 200 may be a device such as a smartphone, tablet computer, personal computer, or other electronic computing device capable of network communication.

A user may set the ask price for use of the vehicle storage area 15 using the user device 200. For example, after setting up a user account and creating a profile of the vehicle storage area 15, the user can make the vehicle storage area 15 available for use by autonomous vehicles 120. The user may set an ask price for the vehicle storage area 15. The ask price is the price the user requests in exchange for use of the vehicle service area 15 by an autonomous vehicle 120 of the fleet of the TaaS service.

The user device 200 includes a user interface that permits the user to set up a user account, set up a profile for the vehicle storage area 15, and set the ask price of the vehicle storage area 15. The user interface may also display other data to the user such as average ask price for other vehicle storage areas 15 in the neighborhood or area surrounding the vehicle storage area 15. The user interface of user device 200 may additionally be employed by the user to select various options such as: whether the ask price is fixed or variable (and additionally a range of ask prices such as a minimum and/or maximum); and whether the platform 100 may solicit bids (e.g., via a Dutch auction or ascending price auction) for use of the user's vehicle storage area 15 by a specific autonomous vehicle or for TaaS-exclusive use such as an extended or recurring basis.

After the user sets the ask price for their vehicle storage area 15 using the user device 200, the user device 200 communicates the ask price to at least one of the access control platform server 101 and the autonomous vehicle service server 150. The ask price may then be stored in at least one of the access control platform database 102 and the TaaS database 132. For example, the user may enter an ask price for use of the vehicle storage area 15 using the user device 200 and the user device 200 may transmit the ask price to the access control platform server 101. The access control platform server 101 may then store the ask price in the access control platform database 102 in association with the secured space ID of the vehicle storage area 15 for which the user set the ask price.

Figure 6:
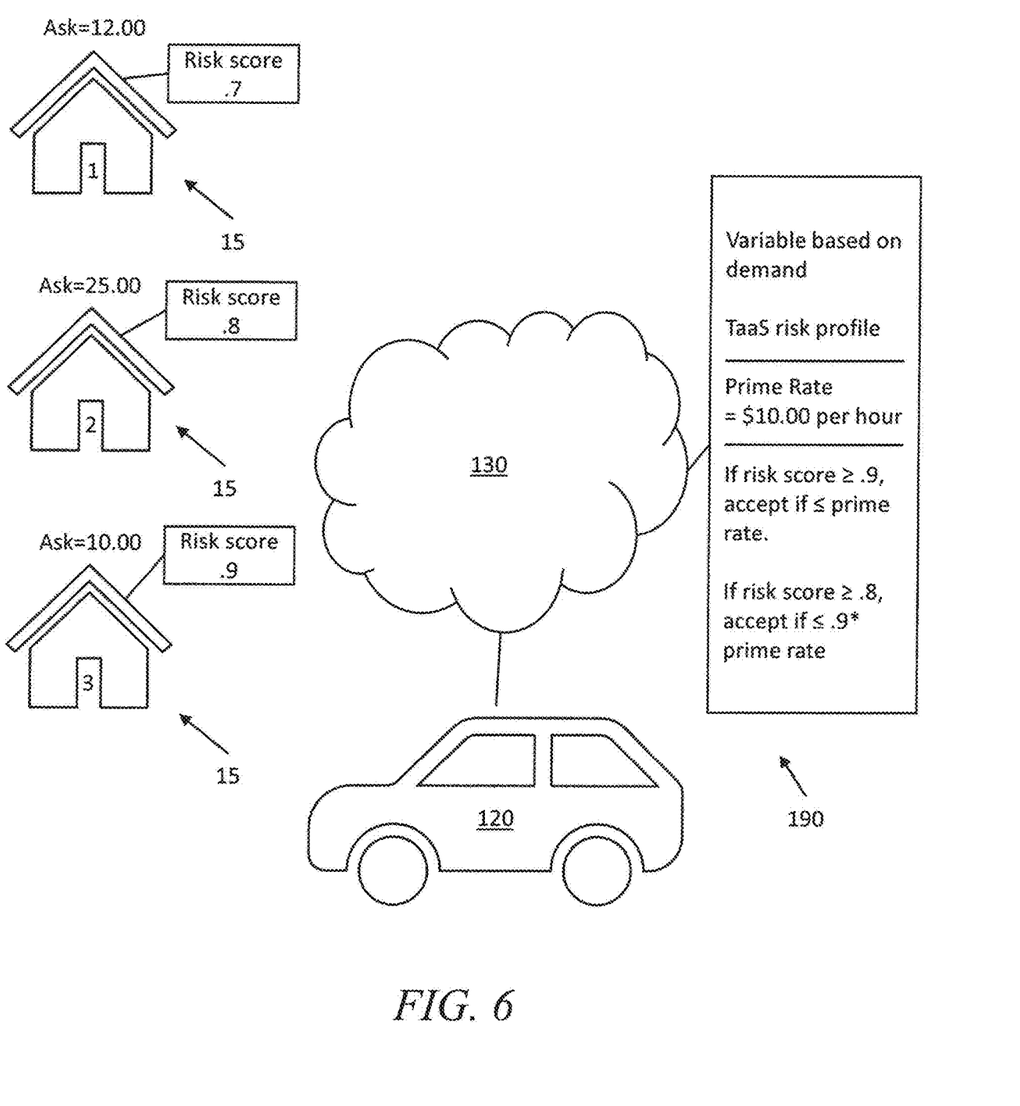
FIG. 6 is a schematic view of a network computing device enabled to determine which vehicle storage area to direct an autonomous vehicle to based on a price-risk function.

The autonomous vehicle 120 may make a parking or access request to either the access control platform server 101 or the autonomous vehicle service server 150. In the case that the autonomous vehicle 120 makes a parking request to the autonomous vehicle service server 150, the autonomous vehicle service server 150 may request information regarding a vehicle storage area 15. The requested information may include the ask price the user set for the vehicle storage area 15 and the risk score associated with the vehicle storage area 15. The autonomous vehicle service server 150, upon receipt of the ask price and the risk score, may determine which of the vehicle storage areas 15 to direct the autonomous vehicle 120 to park in based on a risk-pricing function. An example risk-pricing function 190 is shown in FIG. 6, however other suitable functions that balance price and risk may be employed.

Figure 8:
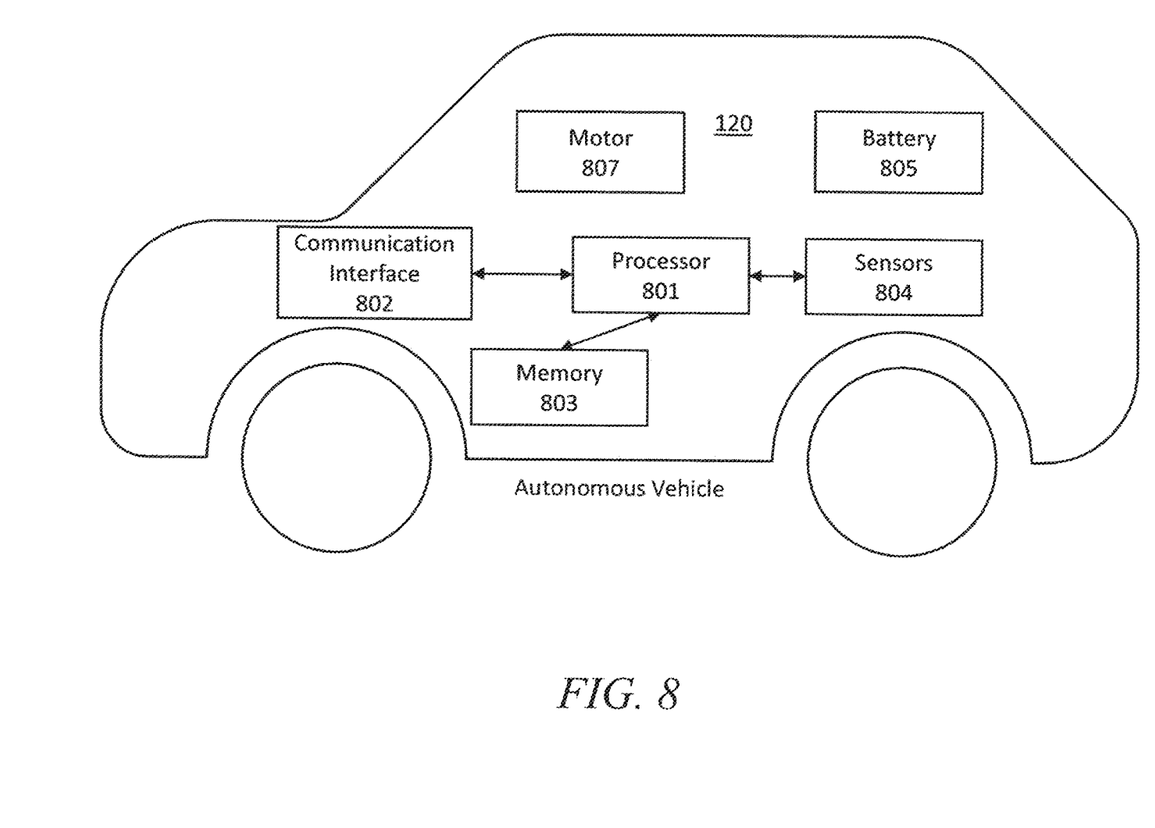
FIG. 8 is a functional-block diagram of an example autonomous vehicle.

Regarding FIG. 8, the autonomous vehicle 120 may have a processor 801 coupled or connected to a memory 803 and one or more sensors 804 for sensing the environment external to the autonomous vehicle 120 such as the physical dimension of a vehicle storage area and observable hazards such as unstable shelf 223, hazardous materials 221, and loose ceiling tile 225. Likewise, the autonomous vehicle 120 may have a battery 805 that powers any or all of the processor 801, the communication interface 802, the memory 803, the one or more sensors 804, and one or more drive motors 807 for propelling the autonomous vehicle 120. As can be appreciated, the autonomous vehicle 120 may be a plug-in electric vehicle, a plug-in hybrid electric/IC (internal combustion) vehicle, a hybrid electric vehicle, or an internal combustion vehicle. Additionally the autonomous vehicle 120 may be a "connected" car such that the communication interface 802 facilitates receipt and transmission of messages, information, signals, and the like via a wide-area network (e.g., cellular terrestrial, satellite, etc.). Alternatively or additionally, the communication interface 802 may be configured for short range communications with proximate objects (e.g., other vehicles, transportation system infrastructure, pedestrians, etc.) via peer-to-peer or ad-hoc mesh networks using one or more of vehicle-to-vehicle (V2V), vehicle-to-infrastructure (V2I), vehicle-to-anything (V2X) protocols. The autonomous vehicle 120 may be either fully autonomous or semi-autonomous. A fully autonomous vehicle is a self-driving, driverless vehicle that can operate without a human driver in the vehicle or operating the vehicle remotely. A semiautonomous vehicle is a vehicle that can operate autonomously when performing certain functions but can utilize human intervention, either by a driver in the vehicle or a remote driver, for certain other functions. Although the autonomous vehicle 120 is shown as a wheeled, terrestrial car or truck, nevertheless the autonomous vehicle may alternatively or additionally be embodied as an aerial vehicle, a watercraft, or a combination land/water/air vehicle. Accordingly the vehicle storage area 15 may additionally or alternatively be embodied as a boat slip, a helipad, a hangar or combinations/portions thereof to which access is controlled via a barrier and movable barrier operator.

Figure 9:
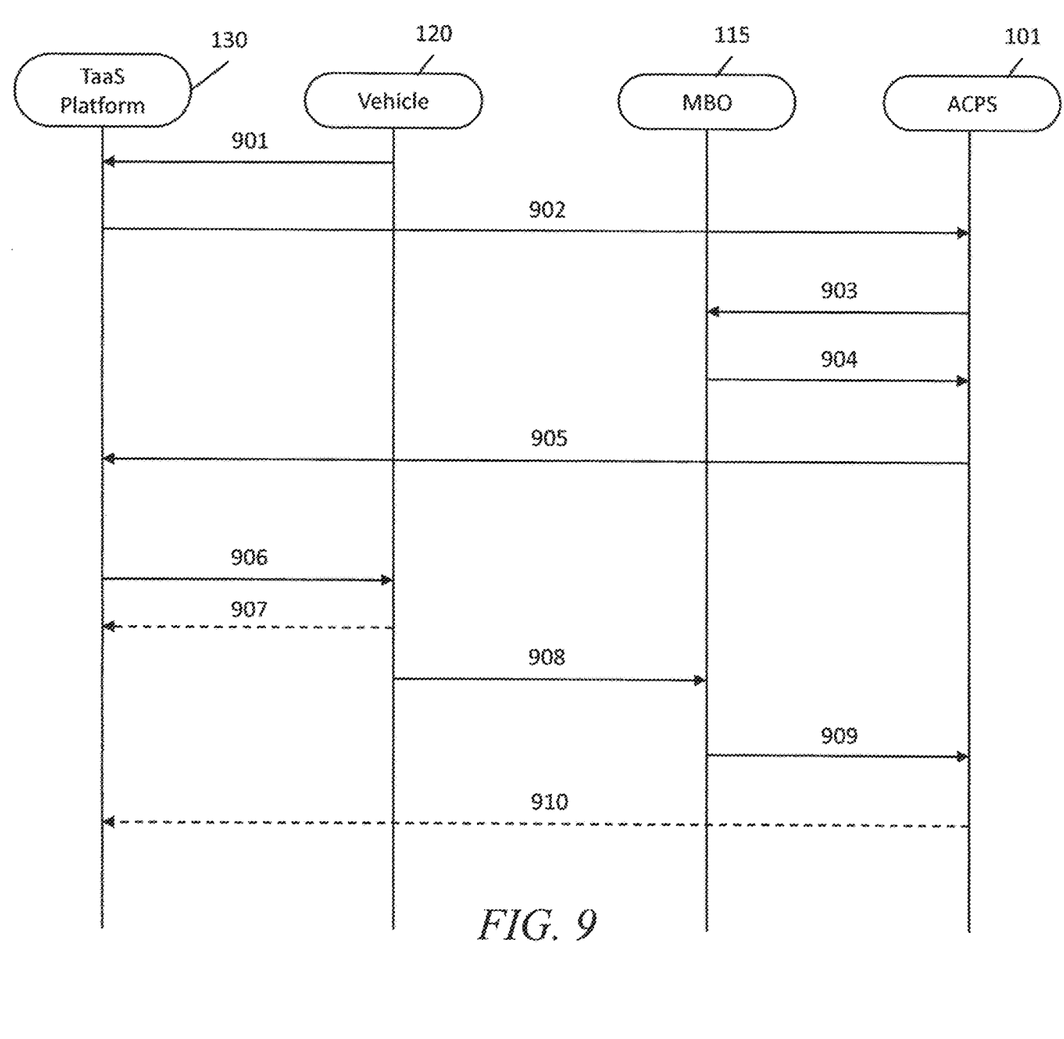
FIG. 9 illustrates a first example communication flow between devices of the control system of FIG. 1.

In order for the autonomous vehicle 120 to operate (or cause operation of) the movable barrier operator 115 and gain access to the vehicle storage area 15, the access control platform server 101 may communicate a single-use access credential, such as a temporary access credential, to the autonomous vehicle 120 that is configured to operate the movable barrier operator 115. The single-use access credential may be selected (e.g., from a list) or otherwise created, generated or instantiated by single-access credential generator 103 as shown in FIGS. 1 and 5 using various techniques that include, for example, rolling or changing codes known in the art. The single-use access credential improves the security of the home, business, or other area associated with the vehicle storage area 15 when a user decides to make the vehicle storage area 15 available for use by autonomous vehicles 120. FIG. 9 illustrates an example of a communication flow of a single-use access credential between the devices of the autonomous vehicle control system 1 of FIG. 1. In operation 901, the vehicle 120 may communicate with the TaaS platform 130 to request that the TaaS platform 130 direct the autonomous vehicle 120 to a vehicle storage area 15. In operation 902, after the TaaS platform 130 determines (e.g., using risk calculation/algorithm 170 and/or risk-pricing function 190) a vehicle storage area 15 for the autonomous vehicle 120 to be stored in, the TaaS platform 130 may request access credentials allowing it to operate the movable barrier operator 115 associated with the vehicle storage area 15 from the access control platform server 101. Alternatively, in operation 902, the TaaS platform 130 may forward the access request to the access control platform server 101 without determining a vehicle storage area 15 and instead the access control platform server 101 may determine the vehicle storage area 15 and associated movable barrier operator 115.

In operation 903, the access control platform server 101 may send an access credential request to the movable barrier operator 115 associated with the determined vehicle storage area 15. Upon receipt of the access credential request, the movable barrier operator 115 may generate a single-use access credential and send the single-use access credential to the access control platform server 101 in operation 904. The movable barrier operator 115 additionally or alternatively transmits the single-use access credential to the TaaS platform 130. Instead of sending the access credential request to the movable barrier operator 115 in operation 903, the access control platform server 101 may, itself, determine the single-use access credential and in operation 903 the access control platform server 101 may send the single-use access credential to the movable barrier operator 115. In operation 904, the movable barrier operator 115 may acknowledge that it has received the single-use access credential.

The single-use access credential may be a temporary access credential that is valid for only a set amount of time. For example, the TaaS platform 130 may calculate an expected arrival time of the autonomous vehicle 120 at the vehicle storage area 15 based on the current location of the autonomous vehicle 120 and the TaaS platform 130 may request that the access control platform server 101 or movable barrier operator 115 generate a temporary access credential based on the calculated arrival time. As will be described in more detail below, when autonomous vehicle 120 arrives at a vehicle storage area 15, the autonomous vehicle 120 will transmit the temporary access credential to the movable barrier operator 115 to open the associated movable barrier and allow the autonomous vehicle 120 to access the vehicle storage area 15. The access control platform server 101 may validate the temporary access credential only in, for example, a IS-minute window surrounding the estimated arrival time. Alternatively, the temporary access credential may be valid for a set period of time after it is requested such as 10, 15, or 20 minutes. The set period of time may be any length of time.

The calculated arrival time may be encrypted and used as the temporary access credential. The calculated arrival time may be encrypted using a homomorphic encryption algorithm. As such, changes in arrival time may be added or subtracted from the originally calculated arrival time without decrypting the temporary access credential. For example, if the originally calculated arrival time is 4:30 pm and the access control platform server 101 sent (4:30 pm) encrypted to either or both of the movable barrier operator 115 and the autonomous vehicle 120 as the temporary access credential and if the TaaS platform 130 determines that it will take 15 minutes longer to reach a secured space than originally calculated, the TaaS platform 130 may send (+15 minutes) encrypted to either or both of the movable barrier operator 115 and the autonomous vehicle 120 and the temporary access credential can be updated without decrypting the temporary access credential or requesting that the access control platform server 101 generate a new temporary access credential. This allows the window surrounding the arrival time to be as small as possible and increases security because the temporary access credential can be updated and the window can be shifted without retransmitting the entire temporary access credential. The TaaS platform 130 may determine whether an individual or aggregate arrival time change places the arrival time outside the window of the originally calculated arrival time and update the temporary access credential only if the change in arrival time places the arrival outside the window.

In another example, the single-use access credential may be a temporary access credential that is derived from information associated with the autonomous vehicle. For instance, the temporary access credential may be a numeric or alphanumeric code resulting from performance of a hash function on an identifier such as a VIN (vehicle identification number), MAC (media access control) address, IP (internet protocol) address or the like that is at least one of specific and substantially unique to the autonomous vehicle. To this end, the access control platform server 101 may: retrieve or receive vehicle-specific information from the data structure 102; hash an identifier or identifiers associated with the autonomous vehicle; and communicate (e.g., via a message of operation 904 of FIG. 9) the hashed identifier(s) to a barrier operator such that, upon arrival of the autonomous vehicle 120 at the storage area 15, the barrier operator 115 compares a newly-received identifier (or hashed version thereof) from/of the autonomous vehicle with a previously-received hashed identifier of operation 904. In view of the foregoing the temporary access credential may only be communicated to the barrier operator 115 rather than the vehicle 120 and the barrier operator thereby conserving resources in the system 1.

In yet another example an asymmetric cryptographic technique may be employed in which a public key of the autonomous vehicle 120 is stored by the access control platform server 101 or data structure 102. Accordingly the vehicle's public key may be communicated to barrier operator in operation 903 such that use of a private key by the vehicle facilitates access to a storage area 15 associated with the barrier operator.

Prior to the movable barrier operator 115 providing the temporary access credential to the access control platform server 101 in operation 904, the user offering the vehicle storage area 15 associated with the movable barrier operator 115 for use may be sent a permission request requesting permission to grant a temporary access credential to the autonomous vehicle 120. If the user indicates that a temporary access credential should be granted, using for example the user device 200 (see FIG. 5), then the access control platform server 101 will generate and send the temporary access credential.

In operation 905, the access control platform server 101 may send the TaaS platform 130 the temporary access credential, and in operation 906 the TaaS platform 130 may relay or otherwise send the temporary access credential to the autonomous vehicle 120 and/or the movable barrier operator 115. Optionally, in operation 907, the autonomous vehicle 120 may send a message acknowledging receipt of the temporary access credential to the Taas platform 130. Alternatively, or additionally, the autonomous vehicle 120 may send the message acknowledging receipt of the temporary access credential to the access control platform server 101.

In operation 908, the autonomous vehicle 120 may send a command signal, such as a request to move (e.g., open or close) a barrier and/or actuate a barrier operator 115, including the temporary access credential to the movable barrier operator 115 of the vehicle storage system 110 to open a movable barrier, such as the garage door 217 (see FIG. 2) controlled by the movable barrier operator 115. In operation 909, the movable barrier operator 115 may send a message or notification to the access control platform server 101 indicating that the autonomous vehicle 120 has used the temporary access credential and, optionally, in operation 910 the access control platform server 101 may relay or otherwise send the message or notification to the TaaS platform 130 to allow the TaaS platform 130 to reconcile billing. The notification permits the TaaS platform 130 to confirm that the autonomous vehicle 120 is using the vehicle storage area 115 to which the TaaS platform 130 directed the autonomous vehicle 120.

Figure 10:
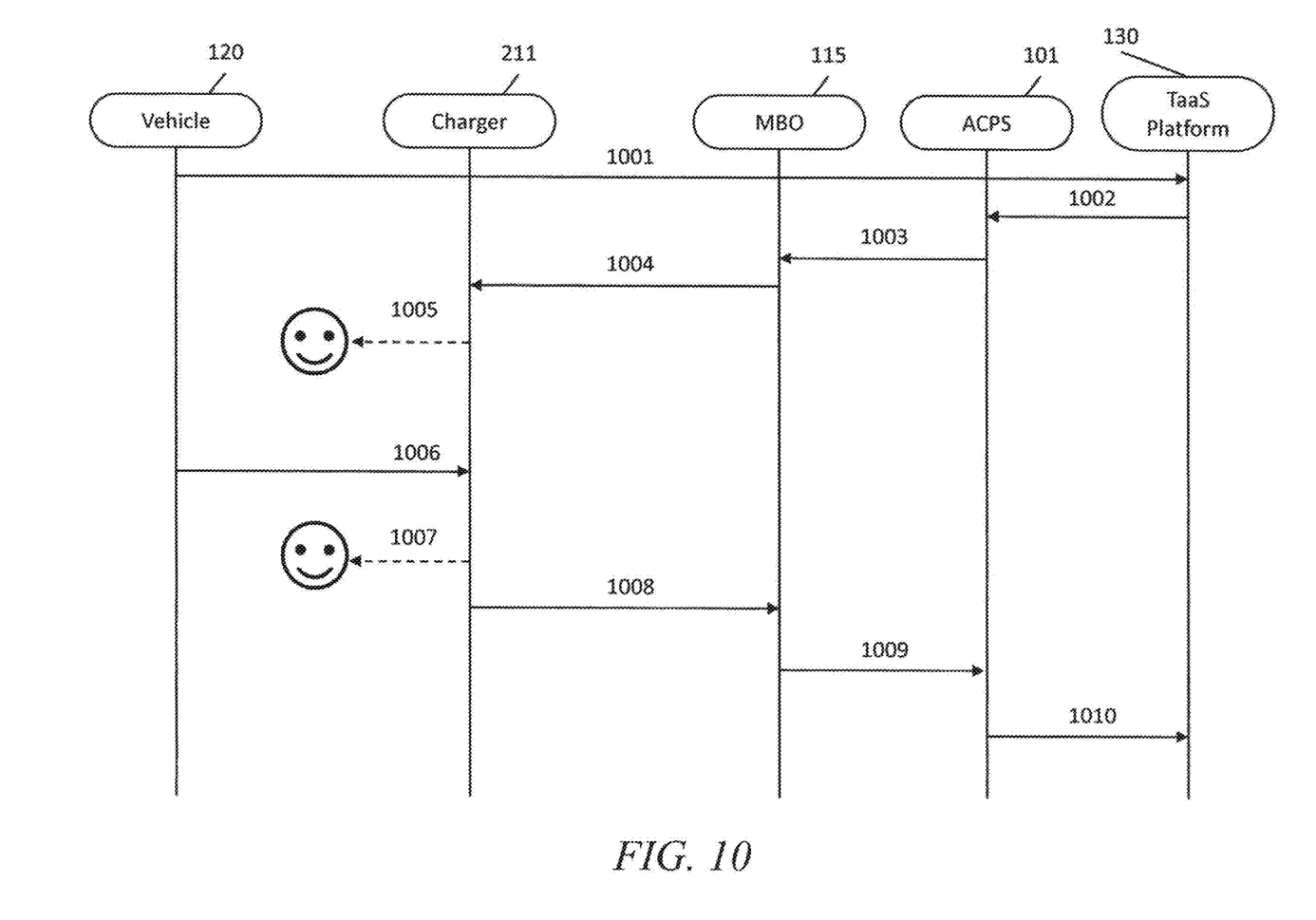
FIG. 10 illustrates a second example communication flow between the devices of the control system of FIG. 5.

FIG. 10 illustrates an example of a communication flow between the devices of the autonomous vehicle control system 1 to facilitate charging of the autonomous vehicle 120 while the autonomous vehicle 120 is stored in the vehicle storage area 15. In operation 1001, the autonomous vehicle 120 sends a charging request to the TaaS platform 130 requesting that the battery 805 of the autonomous vehicle 120 be charged. In operation 1002, the TaaS platform 130 may relay or otherwise send the charging request to the access control platform server 101. The access control platform server 101 may then determine whether the vehicle storage area 15 is capable of charging the autonomous vehicle 120. If the access control platform server 101 determines that the vehicle storage area 15 is capable of charging the autonomous vehicle 120, the access control platform server 101 may authorize a charger 211 (FIG. 2) of the vehicle storage area 15 to be used by the autonomous vehicle 120. If the vehicle storage area 15 is not capable of charging the autonomous vehicle 120, the autonomous vehicle 120 may request that the autonomous vehicle control system 1 find a vehicle storage area 15 in which the autonomous vehicle 120 may be charged.

In operation 1003, the access control platform server 101 may send the charging request to the movable barrier operator 115. Alternatively, in operation 1003, the access control platform server 101 may send the charging request directly to the charger 211 of the vehicle storage area 15, or to a charging network associated with the charger 211.

In operation 1004, the movable barrier operator 115 may send the charging request to the charger 211 of the vehicle storage area 15 or to a charging network associated with the charger 211. Optionally, in operation 1005 a user or another party associated with the vehicle storage area 15 may be notified, by, for example, sending a message to the user device 200, to connect the charger 211 to the autonomous vehicle 120. However, in other instances when the charger 211 is a wireless (inductive) power station, at least one of the access control platform server 101, the barrier operator 115 and the vehicle 120 may cause the charger 211 to be activated or energized for vehicle charging without human intervention. In operation 1006, the autonomous vehicle 120 may notify the charger 211 or charging network that charging is complete. If human intervention for charging occurred in operation 1005, optionally in operation 1007, the user or another party associated with the vehicle storage area 15 may be notified, by for example sending a message to the user device 200 (FIG. 5), to disconnect the charger 211 from the autonomous vehicle 120. Alternatively if no human intervention was employed for charging, the charger 211 may be deactivated or de-energized after receipt of a message, signal or notification from vehicle 120.

In operation 1008, the charger 211 may notify the movable barrier operator 115 that charging has been completed and then in operation 1009 the movable barrier operator 115 may notify the access control platform server 101 that charging has been completed. Optionally, in operation 1010, the access control platform server 101 may notify the TaaS platform 130 that the autonomous vehicle 120 has been charged so that the TaaS platform 130 can reconcile billing.

Figure 11:
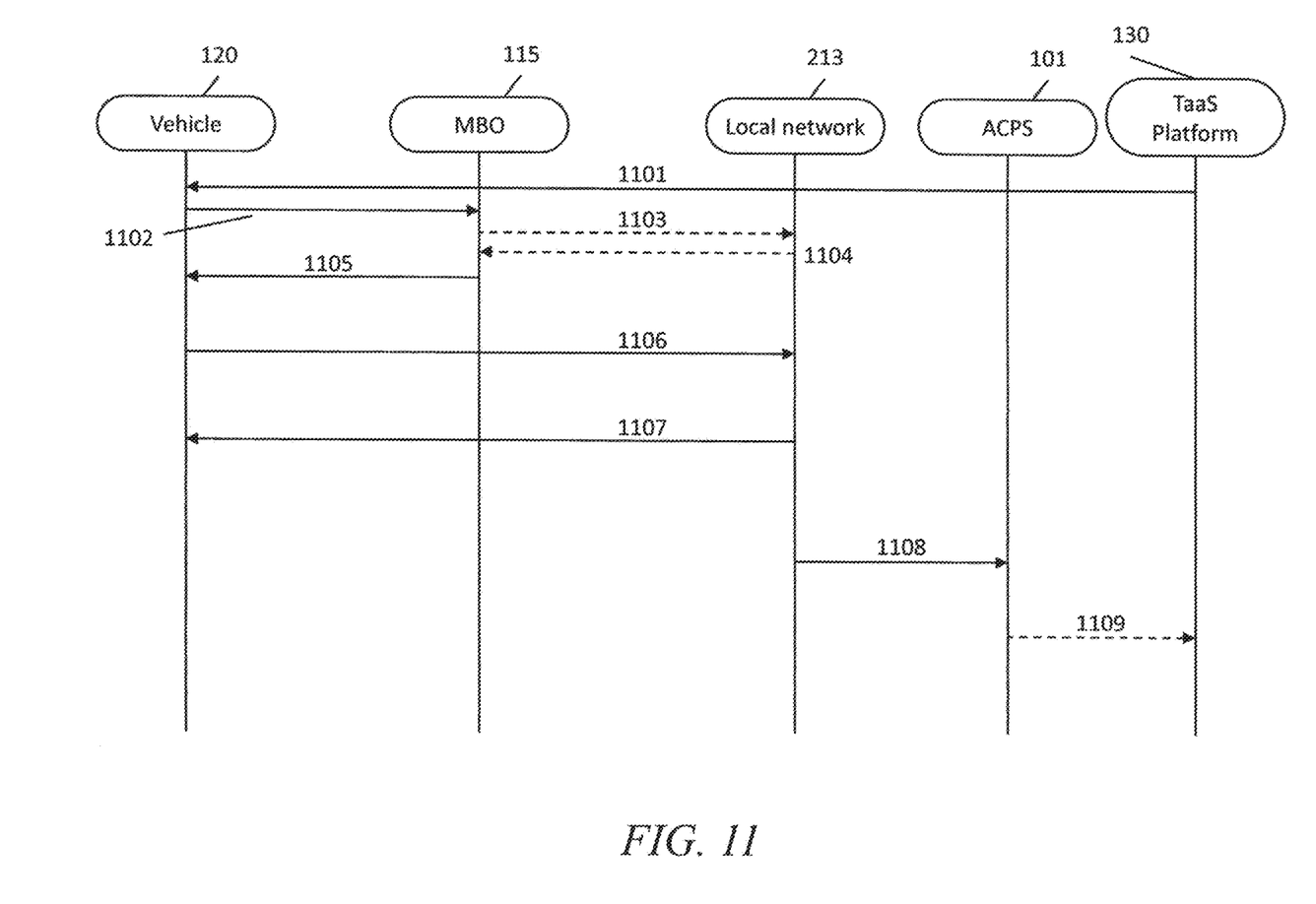
FIG. 11 illustrates a third example communication flow between the devices of the autonomous vehicle control system illustrated of FIG. 1.

FIG. 11 illustrates an example of a communication flow between the devices of the autonomous vehicle control system 1 illustrated in FIG. 1 to facilitate updating of the autonomous vehicle 120. In operation 1101, the TaaS platform 130 may send a notification to the autonomous vehicle 120 notifying the autonomous vehicle 120 that the autonomous vehicle 120 is to be updated and, after the autonomous vehicle 120 is parked in the vehicle storage area 15, in operation 1102 the autonomous vehicle 120 may communicate with the movable barrier operator ("MBO") 115 to request access credentials for a local network 213, such as a home WiFi network. Optionally, in operations 1103 and 1104, the movable barrier operator 115 (which may already be attached/connected to or otherwise associated with the local network 213) may communicate with a local network entity such as a modem, an access point, or a router to obtain temporary access credentials. Then, in operation 1105, the movable barrier operator 115 may transmit the temporary access credentials for the local network 213 to the autonomous vehicle 120 and in operation 1106 the autonomous vehicle 120 may connect to the local network 213. Additionally the movable barrier operator 115 may transmit in operation 1105 network information to the vehicle 120, for example the network name (e.g., service set identifier (SSID) of the wireless local area network) when the network is hidden/private or the name is not broadcast.

In operation 1107, the autonomous vehicle 120 may request, pull or otherwise download the pending updates. The updates may include but are not limited to: software and/or firmware (e.g., patches); infotainment media; navigation/map data; journey/trip scheduling information, as some examples. Alternatively, in operation 1107 the TaaS platform 130 may recognize that the autonomous vehicle 120 is on the local network 213 and push the pending updates to the vehicle. In operation 1108, the movable barrier operator 115 may communicate with the access control platform server 101 via the connection between the autonomous vehicle 120 and the TaaS platform 130. For example, the local network entity may communicate the connection time, the number of packets sent and received, or the total amount of data transferred. And, optionally, in operation 1109, the access control platform server 100 may notify the TaaS platform 130 of the use of the local network so that the TaaS platform 130 may reconcile billing.

While there have been illustrated and described particular embodiments, it will be appreciated that numerous changes and modifications will occur to those skilled in the art, and it is intended for the present disclosure to cover all those changes and modifications which fall within the scope of the appended claims. Although method operations may be presented and described herein in a sequential fashion, one or more of the operations shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A computer-implemented method for setting an ask price of a vehicle storage area, the method comprising:
   receiving, at a server, a first ask price associated with a cost to use a first vehicle storage area;
   receiving, at the server, a second ask price associated with a cost to use a second vehicle storage area;

storing, in a database, the first ask price in association with the first vehicle storage area and the second ask price in association with the second vehicle storage area;

receiving, at the server, a parking request from an autonomous vehicle;

selecting, by a processor of the server, between the first and second vehicle storage areas to direct the autonomous vehicle to park based on a pricing function, the pricing function based, at least in part, on the first and second ask prices; and notifying, from the server, the autonomous vehicle the selected one of the first or second vehicle storage areas for parking.

2. The method of claim 1, wherein the pricing function is further based on a risk determination, the risk determination accounting for one or more risk score factors associated with each of the first and second vehicle storage areas.

3. The method of claim 2, wherein the risk determination includes a presence of children in a household, a crime rate associated with a neighborhood associated with the household, a damage history profile, a presence of hazardous materials, a presence of objects poised to fall on the autonomous vehicle, or any combination thereof.

4. The method of claim 1, wherein the first ask price is transmitted from a user device, the user device comprising a smartphone, and wherein a user enters the first ask price for use of the first vehicle storage area via the user device.

5. The method of claim 4, wherein communication circuitry associated with the server transmits data to the user device, the data including an average ask price for other vehicle storage areas in a surrounding area.

6. The method of claim 4, wherein the user creates a profile associated with the first vehicle storage area, the profile including whether the first ask price is fixed or variable.

7. The method of claim 4, wherein the user creates a profile associated with the first vehicle storage area, the profile including whether the user seeks to solicit bids for use of the first vehicle storage area.

8. The method of claim 1, wherein the server comprises an access control platform server, and wherein the parking request is transmitted to the access control platform server from an autonomous vehicle service server.

9. The method of claim 1, wherein the server communicates a temporary access credential to a movable barrier operator associated with the selected one of the first or second vehicle storage areas to permit operation of the movable barrier operator by the autonomous vehicle.

10. The method of claim 9, wherein a processor associated with the sever is configured to obtain an expected arrival time of the autonomous vehicle at the selected one of the vehicle storage areas, and wherein the temporary access credential is based at least in part upon the expected arrival time.

11. The method of claim 9, wherein the temporary access credential includes a public key associated with the autonomous vehicle.

12. The method of claim 1, wherein the memory is further configured to store information regarding availability of the first and second vehicle storage areas, and wherein the processor is configured to select between the first and second vehicle storage areas based at least in part upon availability of the first and second vehicle storage areas.

13. The method of claim 1, wherein the server is configured to facilitate communication of at least one of software updates and firmware updates to the autonomous vehicle at the selected one of the vehicle storage areas.

14. A non-transitory computer readable medium having instructions stored thereon that, when executed by a processor of a network computing device, cause performance of operations comprising:

receiving, at a server, a first ask price associated with a cost to use a first vehicle storage area;

receiving, at the server, a second ask price associated with a cost to use a second vehicle storage area;

storing, in a database of the server, the first ask price in association with the first vehicle storage area and the second ask price in association with the second vehicle storage area;

receiving, at the server, a parking request from an autonomous vehicle;

selecting, at the server, between the first and second vehicle storage areas to direct the autonomous vehicle to park based on a pricing function, the pricing function based, at least in part, on the first and second ask prices; and notifying, from the server, the autonomous vehicle the selected one of the first or second vehicle storage areas for parking.

15. The non-transitory computer readable medium of claim 14, wherein the pricing function is further based on a risk determination, the risk determination accounting for one or more risk score factors associated with each of the first and second vehicle storage areas.

16. The method of claim 15, wherein the risk determination includes a presence of children in a household, a crime rate associated with a neighborhood associated with the household, a damage history profile, a presence of hazardous materials, a presence of objects poised to fall on the autonomous vehicle, or any combination thereof.

17. The method of claim 14, wherein the first ask price is transmitted from a user device, the user device comprising a smartphone, and wherein a user enters the first ask price for use of the first vehicle storage area via the user device.

18. The method of claim 17, wherein the server further transmits data to the user device, the data including an average ask price for other vehicle storage areas in a surrounding area.

19. The method of claim 17, wherein the user creates a profile associated with the first vehicle storage area, the profile including whether the ask price is fixed or variable.

20. The method of claim 14, wherein the server comprises an access control platform server, and wherein the parking request is transmitted to the access control platform server from an autonomous vehicle service server.

* * * * *